US011809875B2

(12) United States Patent
Suryanarayana et al.

(10) Patent No.: US 11,809,875 B2
(45) Date of Patent: Nov. 7, 2023

(54) LOW-POWER PRE-BOOT OPERATIONS USING A MULTIPLE CORES FOR AN INFORMATION HANDLING SYSTEM

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 17/450,189

(22) Filed: Oct. 7, 2021

(65) Prior Publication Data
US 2023/0112947 A1 Apr. 13, 2023

(51) Int. Cl.
| | | |
|---|---|---|
| *G06F 9/4401* | (2018.01) | |
| *G06F 11/36* | (2006.01) | |
| *G06F 15/78* | (2006.01) | |

(52) U.S. Cl.
CPC .......... *G06F 9/4405* (2013.01); *G06F 11/366* (2013.01); *G06F 15/7807* (2013.01)

(58) Field of Classification Search
CPC .............................. G06F 9/4405; G06F 11/366
USPC ............................................................ 713/2
See application file for complete search history.

(56) References Cited

U.S. PATENT DOCUMENTS

| 4,590,556 | A  | * | 5/1986 | Berger | G06F 9/3879 |
| | | | | | 713/1 |
| 7,502,915 | B2 | * | 3/2009 | Jacob | G06F 15/7867 |
| | | | | | 712/16 |
| 2003/0084206 | A1 | * | 5/2003 | Floman | G06F 9/445 |
| | | | | | 710/1 |
| 2005/0013705 | A1 | * | 1/2005 | Farkas | G06F 9/5088 |
| | | | | | 417/393 |
| 2005/0182922 | A1 | * | 8/2005 | Guo | G06F 9/441 |
| | | | | | 713/1 |
| 2006/0070032 | A1 | * | 3/2006 | Bramley | G06F 9/485 |
| | | | | | 717/124 |
| 2006/0259815 | A1 | * | 11/2006 | Graham | G06F 11/1662 |
| | | | | | 714/11 |
| 2007/0174689 | A1 | * | 7/2007 | Chen | G06F 11/1417 |
| | | | | | 714/13 |
| 2016/0360526 | A1 | * | 12/2016 | Lehmann | G06F 3/0227 |

(Continued)

*Primary Examiner* — Paul R. Myers
(74) *Attorney, Agent, or Firm* — Norton Rose Fulbright US LLP

(57) ABSTRACT

A basic input/output system (BIOS) may load an embedded operating system (EOS), and the light-weight EOS may operate as a single captive portal for all pre-boot operations. With a single captive portal, the EOS may provide a multi-task environment to facilitate quicker execution of multiple pre-boot tasks within a single environment to reduce a number of reboots. In some embodiments, power consumption by performing the tasks within the EOS may be reduced by executing operations using a low-power core of an information handling system, such as a "little" core of a system on chip (SoC) having multiple "big" and "little" cores or a hybrid core of an information handling system. More generically, the EOS may execute on one or both of a first processor core and second processor core of an information handling system, in which the first and second processor cores are configured differently.

20 Claims, 6 Drawing Sheets

(56) References Cited

U.S. PATENT DOCUMENTS

2018/0314832 A1\* 11/2018 Nunami ............... G06F 9/4416
2022/0382561 A1\* 12/2022 Suryanarayana ... G06F 9/44505

\* cited by examiner

LOW-POWER PRE-BOOT OPERATIONS USING A MULTIPLE CORES FOR AN INFORMATION HANDLING SYSTEM

FIELD OF THE DISCLOSURE

This disclosure relates to pre-boot operations for an information handling system. More specifically, portions of this disclosure relate to boot operations using a multiple core of a processor of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Pre-boot operations may be performed by individual pre-boot modules for diagnostics, recovery, updates, tampering, malware, reboot, and other functions. Performing tasks with different pre-boot module conventionally involves rebooting the information handling system between each task because there is no single captive portal to support execution of the pre-boot modules. With every reboot to perform tasks in the different pre-boot modes, the information handling system is unavailable to the user and consumes power. Excess power consumption shortens battery life and is undesirable, particularly for battery-powered information handling systems. For example, when an information handling system is reset, the system may executes firmware that performs a boot process to initialize various system components and interfaces, load an operating system, perform various other actions to configure the system into a known and initial state, all of which cause components such as the processor and memory to consume power. Additional requirements of certain pre-boot operations can further complicate execution of these segmented pre-boot modules, particularly on battery powered systems. For example, firmware updates to the BIOS may be allowed only when the battery charge level is greater than 50% or when connected to a power source to reduce the possibility of a power failure interrupting update and corrupting the BIOS. During a low battery charge, even critical firmware updates are not allowed, and operating the information handling system without such critical firmware updates for users can cause inconvenience and/or security risks.

Shortcomings mentioned here are only representative and are included to highlight problems that the inventors have identified with respect to pre-boot operations in information handling systems (IHSs) and sought to improve upon. Aspects of the IHS with one or more features described below may address some or all of the shortcomings as well as others known in the art.

SUMMARY

A basic input/output system (BIOS) may load an embedded operating system (EOS), and the light-weight EOS may operate as a single portal for all pre-boot operations. With a single portal, the EOS may provide a multi-task environment to facilitate quicker execution of multiple pre-boot tasks within a single environment to reduce a number of reboots. For example, the multi-task environment provided by the EOS may allow multiple operations to be completed without rebooting between the operations. In some embodiments, the EOS may provide a user interface and execute individual tasks of the BIOS as instructed by the user, with the task returning back to the EOS to permit performing other operations without reboot. In some embodiments, the EOS may perform one or more of the tasks. One benefit of the single portal for all pre-boot operations is the reduction in number of reboots, which allows a user of the information handling system to perform administrative and configuration tasks involving the BIOS quicker. Another benefit of the single portal for all pre-boot operations is a quicker return to executing user applications because the administrative and configuration tasks are performed quicker. This may improve the productivity of the user of the information handling system. A further benefit of the single portal for all pre-boot operations is a reduction in power consumption when there is a reduction in the number of reboots. Each reboot performs certain repetitive tasks, such as a power-on self-test (POST) that may be unnecessary, and performing those tasks consumes power. Reduced power consumption improves efficiency of the information handling system, which may be beneficial in reducing wasted power, such as in large data centers and in portable battery-powered systems.

In some embodiments, power consumption by performing the tasks within the EOS may be reduced by executing operations using a low-power core of an information handling system. For example, the information handling system may include a processor with multiple cores of different configurations, in which some cores are larger (e.g., larger number of transistors or larger die area) and/or high-performance (e.g., higher benchmark scores, higher number of operations per second, higher frequency operations, higher average power consumption, higher peak power consumption, or higher total dissipated power (TDP)) processor cores and some cores are smaller (e.g., smaller number of transistors or smaller die area) and/or high-efficiency (e.g., lower benchmark scores, lower number of operations per second, lower frequency operation, lower average power consumption, lower peak power consumption, or lower total dissipated power (TDP)) processor cores. In one embodiment, such an information handling system may include a system on chip (SoC) having two configurations of processor cores referred to as "big" cores and "little" cores. The EOS may execute on one or both of a first processor core (e.g., high performance or "big" core) and second processor core (e.g., high efficiency or "small" core) of an information handling system, in which the first and second processor cores are configured differently. The processor core for executing EOS operations may be determined based on an attribute, such as a power attribute (e.g., whether the information handling system is operating based on alternating current (AC) wall power or battery power and/or the current battery charge level) of the information handling system. In some embodiments, the BIOS firmware may implement a hybrid boot-strap protocol (HBP) to initialize a hybrid core (e.g., a high-efficiency core) as a primary bootstrap processor and disable the main core (e.g., a high-performance core) for power savings. The HBP may enable the hybrid core, which may execute the EOS, to dynamically switch between pre-boot operations or other modes, such as a compute intent or power intent execution mode. Having an EOS to support the pre-boot modules in a single boot by running on the hybrid core may save power as well as reboot time.

According to one embodiment, a method may include executing, by a first processor core of an information handling system, a basic input/output system (BIOS); executing, by the first processor core, an embedded operation system (EOS) after executing the BIOS; determining, by the first processor core, based on a first attribute whether to hand-off execution of the EOS to a second processor core having a different configuration than the first processor core; and when the first processor core determines to hand-off execution to the second processor core, handing off execution of the EOS to the second processor core.

In some embodiments, the method may include executing, after beginning execution of the EOS and without rebooting the information handling system, by the EOS at least two EOS operations, the EOS operations including: executing a diagnostics routine, executing a recovery routine, or updating settings of the BIOS. In another embodiment, the method may include executing, by the EOS, at least two EOS operations including executing a first EOS operation on the second processor core; and executing a second EOS operation on a third processor core. In certain embodiments, the method may include executing the EOS includes executing, on the second processor core, an operating system restore operation, wherein the first attribute includes a low battery charge level.

In another embodiment, the method may include executing, by the EOS, a boot routine for the information handling system. In certain embodiments, the method may include configuring, by the EOS executing on the second processor core, components of the information handling system based on the first attribute. In other embodiments, the method may include disabling the first processor core after handing off execution of the EOS to the second processor core.

In some embodiments, the first attribute may include at least one of a power attribute, a thermal attribute, a power supply unit attribute, or a fan attribute. In another embodiment, the method may include handing off execution of the EOS to the second processor core that includes handing off execution of the EOS to a smaller processor core than the first processor core.

In certain embodiments, the method may be implemented in an information handling system (IHS). The IHS may include a memory and a processor that includes a first processor core and a second processor core, and the processor may be coupled to the memory and configured to perform the steps of the method. In another embodiment, the method may be embedded in a computer readable medium as computer program code including instructions that cause the processor coupled to a memory to perform operations corresponding to the steps of the method.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. For example, the hybrid boot-strap protocol (HBP) may be implemented in any of the embodiments of the disclosure. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed method, information handling system, and computer readable medium, reference is now made to the following descriptions taken in conjunction with the accompanying drawings.

DETAILED DESCRIPTION

Figure 1:
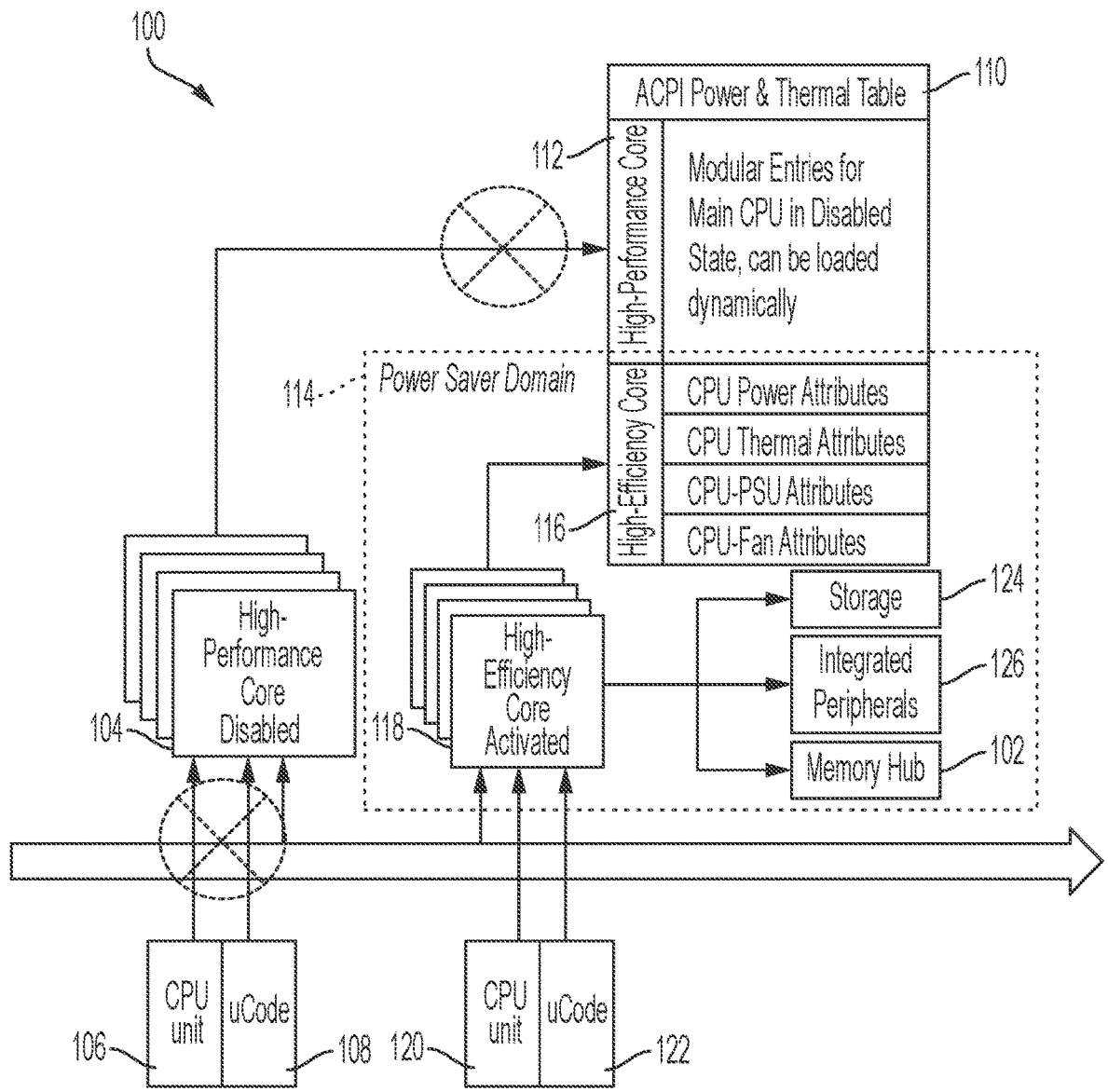
FIG. 1 is a block diagram of a system according to some embodiments of the disclosure.

The basic input/output system (BIOS) may include a pre-boot firmware that may load an embedded operating system (EOS) to support execution of multiple pre-boot modules in a single boot. The pre-boot firmware may initialize cores, such as for low-power operation or high-performance operation, and initiate the execution of the EOS according to the initialized core configuration. In some embodiments, the BIOS firmware may implement a hybrid boot-strap protocol (HBP) with the EOS to initialize a high-efficiency core as a primary bootstrap processor. When the high-efficiency processor core is initiated, the HBP and EOS may disable the main central processing unit (CPU) for power savings. To save power and reboot time, the EOS may control the high-efficiency core to perform multiple pre-boot operations through a single captive portal for the pre-boot operations without needing to reboot to perform a second pre-boot operation. In some example embodiments, a high-performance core may begin execution of the BIOS and EOS and hand-off execution of the EOS to a high-efficiency core for downloading a recovery image from a network location. In some example embodiments, a high-performance core may begin execution of the BIOS and EOS and hand-off execution of the EOS to a high-efficiency core for performing a graphics processor unit (GPU) diagnostic. The high-performance core may determine to perform the hand-off in these examples based on a first attribute of the information handling system at the time the BIOS is booting. For example, the high-performance core may determine a battery charge level, and hand-off execution of the EOS operations (such as downloading a recovery image and/or executing a GPU diagnostics) to the high-efficiency core when the battery charge level is below a certain threshold. After all EOS operations are completed, the EOS may determine a boot device and begin loading an operating system from the boot device. Although high-performance and high-efficiency processor cores are described in certain embodiments, other embodiments may include performing similar operations on first (e.g., primary) and second (e.g., secondary) processors cores with different configurations, whether differently configured for performance, efficiency, power consumption, or other characteristics.

Additionally, the EOS may reconfigure other devices (e.g., storage devices, integrated peripherals, and/or memory) in the information handling system to operate in a low-power mode or another power mode based on the first attribute. The EOS may provide benefits to reducing power consumption in an information handling system because the EOS may operate when the information handling system is running on low on battery. For example, the EOS may implement a recovery module with a backup operation, and the EOS may control devices in a smart power-saver domain to provide power-efficient operations to allow the recovery process to be completed efficiently on remaining battery charge, whereas previously the information handling system may have restricted the execution of the recovery process from operating at low battery charge due to the risk of corruption or data loss if the battery failed prior to completing the recovery process.

The power-saver domain 114 shown in FIG. 1, which is a block diagram of an information handling system 100, may be implemented during pre-boot authentication (PBA) to provide power efficient operations. The high-performance processor core 104 may be disabled by the embedded operating system (EOS). For example, the uCode 108 may not be loaded for the CPU initialization 106. In some embodiments, attributes regarding the high-performance processor core 104 may be collected by the basic input/output system (BIOS) and/or the EOS. For example, the EOS, when initially executing on high-performance processor core 104, may assemble data from the ACPI power & thermal table 110, which can be populated dynamically during boot time, and used as a hand-off block of metadata to pass to the high-efficiency processor core 118.

In some embodiments, the high-performance processor core 104 may initialize the BIOS, which may load the EOS based on the data collected by the BIOS and a platform profile such as a boot profile defined by the EOS. For example, the BIOS may implement high-performance processor core 104 actions before using a hand-off block 110 to prepare data for the EOS. In some embodiments, the handoff may be implemented during a boot device selection phase or another boot phase. The EOS may initialize a high-efficiency processor core 118 in the power saver domain 114 using uCode 122 loaded for the CPU initialization 120. In some embodiments, the high-efficiency processor core 118 may be initialized without resetting the high-performance processor core 104.

The EOS may execute on high-performance processor core 118 based on attributes of the IHS 100, such as those defined in table 116, and the high-efficiency processor core 118 may be configured to operate with low-power values for high-efficiency processor core operations. The attributes may include main CPU attributes 112 from a disabled state such as modular attributes that may be loaded dynamically. In certain embodiments, the main CPU attributes 112 may be based on an active state of the high-performance processor core 104. For example, the first attributes 112 may include CPU actions, power attributes, thermal attributes, power-supply unit attributes, and/or fan attributes before disabling of the high-performance processor core 104. The attributes for IHS 100 may include second attributes 116, such as power attributes, thermal attributes, power-supply unit attributes, and/or fan attributes. Any one of these attributes may be used to determine whether to execute EOS operations on one of the high-performance processor cores 104 or one of the high-efficiency processor cores 118.

When EOS executes on the high-efficiency processor core 118 to configure core 118 as a boot-strap processor, the EOS may tune operating conditions and tasks of the high-efficiency processor core 118. For example, the EOS may adjust the power capabilities of the high-efficiency processor core 118 and/or may instruct the high-efficiency processor core 118 to initialize coupled devices. The coupled devices may include a storage device 124, one or more integrated peripherals 126, a memory hub 102, and/or other devices that may be used in power-efficient operations. In some embodiments, the devices 124, 126, and/or 102 may be configured by the EOS executing on the high-efficiency processor core 118 based on the first attribute, such as a power attribute. For example, storage device 124 may be configured for low-power operation.

In certain embodiments, the BIOS firmware may implement the HBP to initialize a high-efficiency processor core as a primary bootstrap processor. In another embodiment, the HBP may only initialize a low-power operation core or a combination of a low-power operation core with a high-performance operation core based on the platform profile. With the high-efficiency processor core 118 configured as a boot-strap processor, a hybrid boot-strap protocol (HBP) may be used to determine attributes of the IHS 100 such as a boot mode or profile. For example, the EOS may include the HBP. The boot modes may include a boot path to the OS where there is no key press to enter a pre-boot management mode or there is a key press to enter the pre-boot management mode. The boot modes may also include a reboot from the OS to boot into the OS again, a reset from the OS to enter the BIOS mode, and/or a reset from BIOS to re-enter the BIOS mode. In some embodiments, the boot modes may include a back and restore path in the BIOS, a recovery and rollback in the BIOS, and/or a support assist boot to enter an assistance or diagnostic mode. For example, the assistance mode or diagnostic mode may include network connections for remote control, update (through BIOSConnect), and/or diagnostics (through eDiags).

Figure 2:
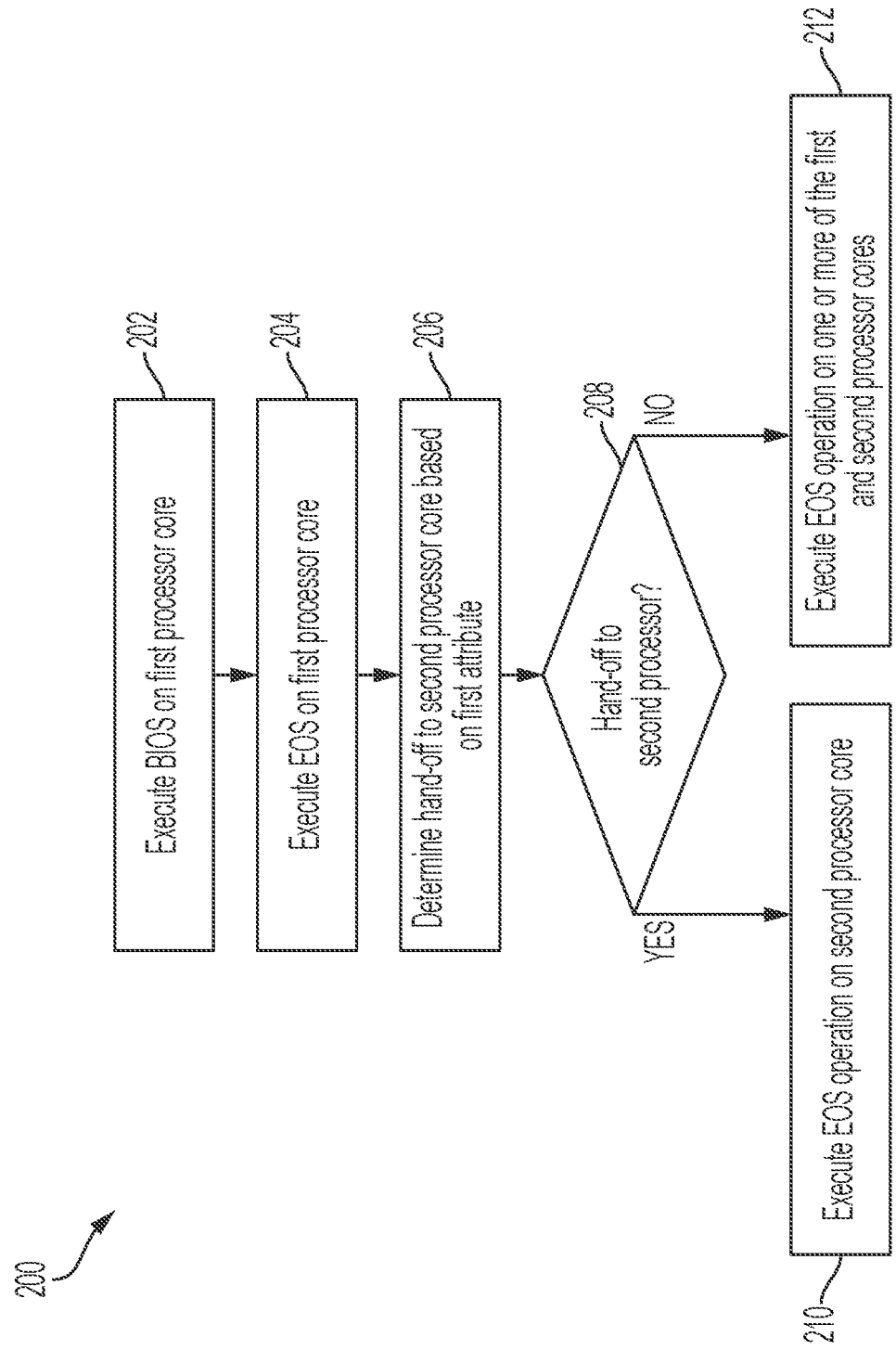
FIG. 2 is a flow chart illustrating a method according to some embodiments of the disclosure.

An information handling system may implement a method 200 shown in FIG. 2 for improving power-efficiency of a boot operation according to some embodiments. At step 202, a BIOS may execute on the first processor core, such as the high-performance processor core. In some embodiments, BIOS execution may include execution of a UEFI front end sequence 302 in which standard UEFI modules (e.g., CRTM, SEC, PEI, DXE) are launched. Based on the POST errors or platform configuration policy, an embedded OS kernel may be launched, such as from a protected NVMe disk, to load embedded OS kernel for performing EOS operations. At step 204, the EOS executes on the first processor core, such as the high-performance processor core. At block 206, the EOS may examine a first attribute and/or other information regarding the state of the information handling system to determine whether to hand-off execution of EOS operations to a second processor core, such as high-efficiency processor core. The criteria applied when examining the first attribute of the processor may be based on the configuration of the first and second processor cores. For example, when the first and second processor cores are configured for different power levels and/or efficiencies, the criteria applied at block 206 to the first attribute may be to examine whether a higher or lower level of power is available (e.g., by examining the battery charge level and availability of wall AC power). As another example, when the first and second processor cores are configured for different processor frequencies, the criteria applied at block 206 to the first attribute may be to examine a quantity of time available for performing tasks.

If, for example, the first attribute meets a first criteria, execution of method 200 at block 208 may result in continuing to block 210 to hand-off execution to the second processor core and execute the EOS operation on the second processor core. In some embodiments, execution of EOS operations may be performed in parallel on two or more second processor cores, such as two high-efficiency processor cores, at block 210. If the criteria are not met at block 208, execution of method 200 may continue to block 212 to continue execution of EOS operations on one of the other or one or more of the first and second processor cores. In some embodiments, execution of EOS operations may be performed in parallel on two or more processor cores from a combination of high-performance processor cores and high-efficiency processor cores available in the information handling system, such as on a combination of high-performance and high-efficiency processor cores at block 212.

Referring to the determination for hand-off at block 206, the criteria may include thresholds or specific criteria for a power attribute, thermal attribute, power-supply unit attribute, fan attribute, and/or a platform profile. For example, the platform profile may include a power profile such as a high-performance mode, a balanced power mode, or low power mode. When the BIOS identifies the low-power mode, the BIOS may initialize the EOS for power efficiency by executing the EOS operations on the second processor core at block 210.

Figure 3:
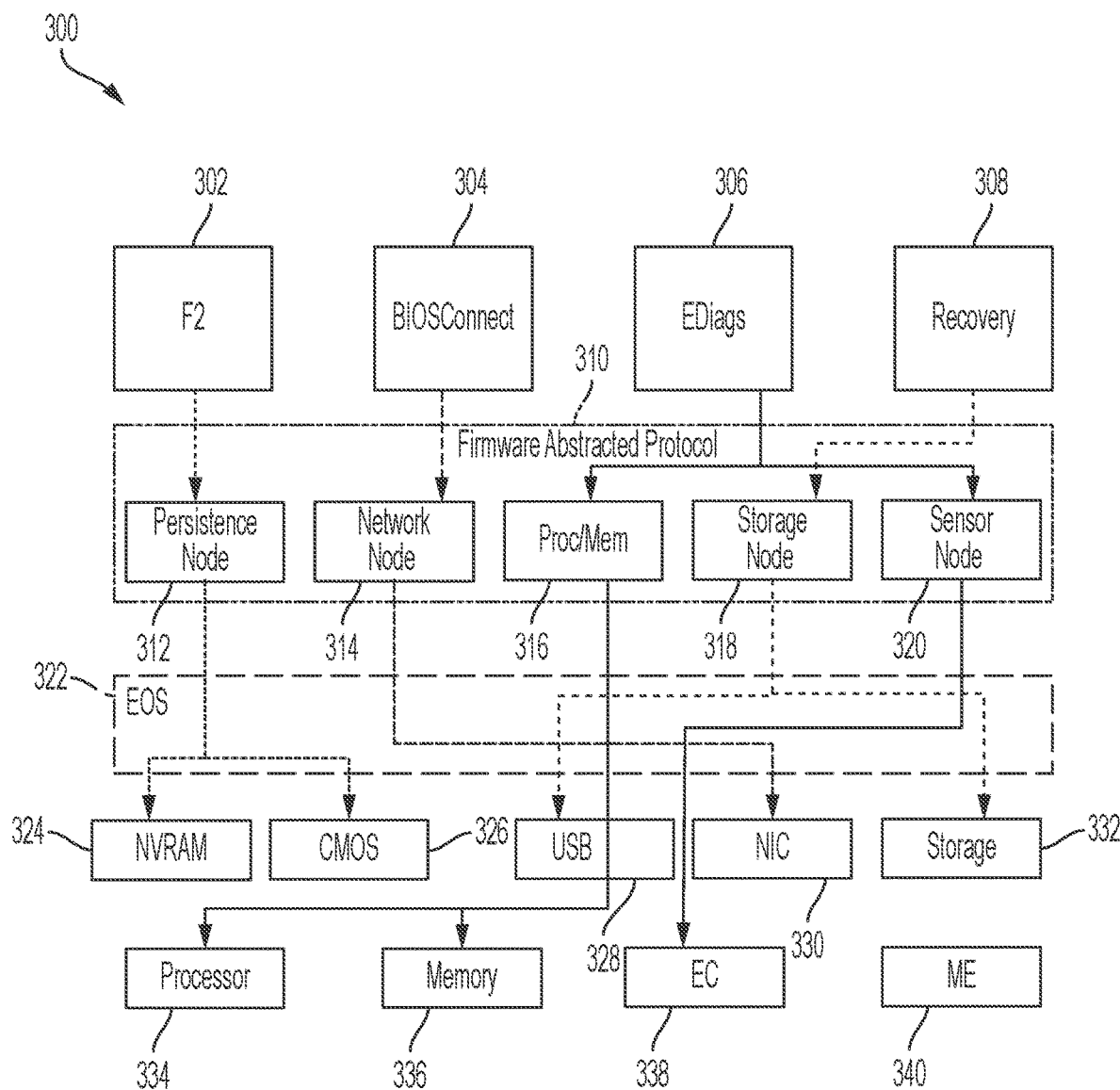
FIG. 3 is a block diagram of a system according to some embodiments of the disclosure.

The EOS may function as a single captive portal that can determine tasks and delegate tasks to the high-efficiency processor core. For example, the EOS may control the high-performance processor core and the high-efficiency processor core to operate in the power saver domain and/or switch between pre-boot operations, high-performance processor core operations, and/or other operations. FIG. 3 illustrates a block diagram of an information handling system (IHS) 300 with an embedded operating system (EOS) 322 as a single captive portal that may be integrated with a firmware abstracted protocol 310 that may include the hybrid boot-strap protocol (HBP). The firmware abstracted protocol may include a persistence node 312, a network node 314, a processor/memory node 316, a storage node 318, a sensor node 320, and/or another comparable node to facilitate integration of the EOS 322 with IHS 300 components (e.g., processor 334, memory 336, etc.) and pre-boot modules for performing EOS operations (e.g., F2 302, BIOSConnect 304, EDiags 306, and Recovery 308).

In some embodiments, the firmware abstractions may be implemented in the EOS 322 in order to handle device specific methods as nodes. A number of modules 302, 304, 306, and/or 308 may be accessed through the single portal of the EOS. For example, a F2 302 module may be integrated to the EOS 322 through the persistence node 312 that may be coupled to a non-volatile random access memory (NVRAM) 324 and/or the complementary metal-oxide semiconductor (CMOS) 326. The F2 302 module may present a user interface for configuring the information handling system 300, such as by changing settings stored in NVRAM 324 and/or CMOS 326. A BIOSConnect 304 module may be integrated with the EOS 322 through the network node 314 that may be coupled to the network interface card (NIC) 330. The BIOSConnect 304 module may present a user interface for performing recovery operations, such as by allowing a user to specify a network location accessible through NIC 330 for loading a recovery image for booting the information handling system 300. In another embodiment, an eDiags 306 module may be integrated with the EOS 322 through the processor/memory node 316 and/or the sensor node 320. The processor/memory node 316 may be coupled to a processor 334 and/or a memory 336. The sensor node 320 may be coupled to an embedded controller (EC) 338 for receiving log records and/or sensor measurements. The eDiags 306 module may present a user interface to allow the user to inspect log records and/or sensor measurements (e.g., CPU temperature, memory temperature, GPU temperature, fan RPM speed, etc.) and/or execute a diagnostics routine. In certain embodiments, a Recovery 308 module may be integrated with the EOS 322 through the storage node 318 that is coupled to the universal serial bus (USB) 328 and/or the storage 332. The Recovery 308 module may present a user interface to allow the user to load a recovery image from a local source, such as the storage 332 or storage coupled to the USB 328, and/or update or replace the BIOS image. In other embodiments, the integration of the modules with the EOS 322 may be implemented through another comparable node, and the coupling of firmware nodes and devices may include connections with a ME 340 or other devices.

The HBP may determine the data and/or platform profile and transmit the information to the EOS 322 using a handoff block. In some embodiments, the handoff block may be from a previous boot wherein the high-performance processor core was initialized as a primary boot-strap processor. For example, the handoff block may transmit the information to the EOS 322 after the BIOS loads the EOS 322, and a high-efficiency processor core may be defined as the boot-strap processor. In certain embodiments, the EOS 322 may re-initialize the high-performance processor core when the operating system (OS) boot is implemented, and the high-performance processor core may coordinate operations with the high-efficiency processor core.

The EOS 322 may control the high-efficiency processor core to execute EOS operations before booting an operating system, such as diagnostics, recovery, updates, tampering, malware, reboot, and other functions. For example, the pre-boot operations may include the F2 302, BIOSConnect 304, eDiags 306, and/or Recovery 308 operation. In certain embodiments, the pre-boot modules may be integrated as a portion of the EOS 322. With a portal for pre-boot operations, a user can enter the F2 302 module, the BIOSConnect 304 module, the eDiags 306 module, and/or another module without a system reboot. Saving time by reducing the number of reboots may save power consumption in the IHS 300. For example, the IHS 300 may save power consumed to perform platform reboots to implement the Recovery 308 module after a system error in the IHS 300.

Additionally, the EOS 322 may optimize devices and drivers in the IHS 300 such as the high-efficiency processor core, storage 332, or other integrated components. The light-weight EOS 322 may load the drivers for a particular pre-boot module to conserve power and time. For example, the EOS 322 may re-initialize different devices to operate in a low-power mode and delegate tasks to the high-efficiency processor core to execute pre-boot operations. For example, the pre-boot module may include a SupportAssist module configured for removing viruses, detecting issues, optimizing settings and alerting the user to updates, and/or aiding backup and restore operations when the IHS 300 is not connected to a power source and has a low battery. The EOS 322 may adjust the IHS 300 systems to operate in a low-power mode to operate efficiently. In certain embodiments, the re-initialized devices may be inside the power saver domain and/or outside the power saver domain.

Figure 4:
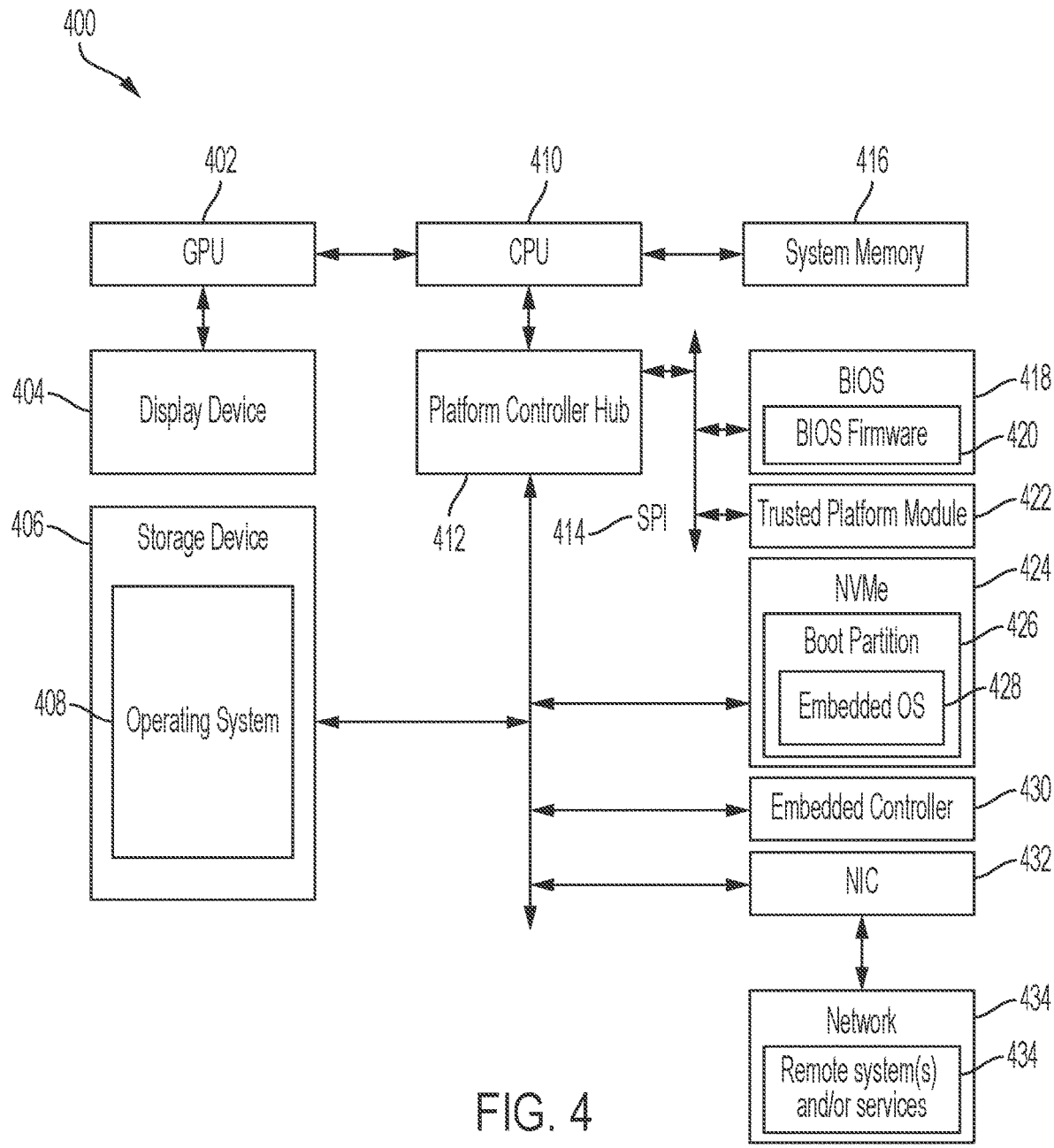
FIG. 4 is a block diagram of a system according to some embodiments of the disclosure.

FIG. 4 illustrates an example information handling system (IHS) 400 for executing an embedded operating system (EOS) according to some embodiments of the disclosure. The IHS 400 may include at least one central processing unit (CPU) 410, a system memory 416, a graphics processing unit (GPU) 402, a display device 404, a platform controller hub (PCH) 412, a basic input/output system (BIOS) 418 containing BIOS firmware 420, a trusted platform module (TPM) 422, non-volatile memory express (NVMe) storage resources 424, a network interface card (NIC) 432, and an embedded controller 430.

System memory 416 may be coupled to CPU 410 and configured to store program instructions or computer program code, which the CPU 410 may execute. The CPU 140 block may include one or more high-performance processor cores and/or one or more high-efficiency processor cores. The system memory 416 may be implemented using any suitable memory technology, including but not limited, to dynamic random access memory or any other suitable type of memory. GPU 402 may be coupled to CPU 410 and configured to coordinate communication between a processor and a display device 404. In some embodiments, the IHS 400 may have one or more display devices 404 and processing units such as the GPU 402 and CPU 410. The CPU 410 may include multiple processor cores, including "big" processor cores configured for high performance and/or "little" processor cores configured for power efficiency. PCH 412 may be coupled to CPU 410 and configured to handle input/output operations for the IHS 400. The PCH 412 may include a variety of communication interfaces and ports for communicating with other components such as a system component, an input/output device, or an expansion bus. For example, the PCH 412 may interface with a serial peripheral interface (SPI) 414, which may interface with the BIOS 418 and TPM 422.

The TPM 422 may be used as a cryptographic processor that includes a random number generator, an asymmetric key generator, a secure hash generator, and a digital signature module. In some embodiments, the TPM 422 may include a storage resource for storing one or more keys and/or platform configuration registers (PCRs). The PCH 412 may be coupled to a NVMe storage resource 424, and the NVMe storage resource 424 may include a NAND flash solid state drive (SSD) configured with a peripheral component interconnect express (PCIe) interface that may be coupled to a PCIe bus. The NVMe storage resource 424 may be configured with a boot partition 426. The boot partition 426 may include an embedded operation system (EOS) 428. In some embodiments, the EOS 428 may be implemented in the TPM 422, and the EOS 428 validates the boot operations. The EOS 428 may be implemented in the TPM 422 to authenticate modules such as the bare metal initrd module. For example, information such as a post error or platform configuration policy may be determined by the IHS 400 and the EOS 428 may be loaded to download a module from the network 434.

Storage device 406 may be coupled to the PCH 412 and be any type of persistent, non-transitory computer readable storage device, including but not limited to, a PCIe storage device such as a hard disk drive (HDDs) or SSDs and may be configured to store software and/or data. For example, the storage device 406 may be configured to store an operating system (OS) 408 or a pre-boot module for the IHS 400 in addition to other software and/or firmware modules and data.

NIC 432 may be coupled to the PCH 412 and enable the IHS 400 to communicate with one or more remotely located systems and/or services 434 via an external network 434 using one or more communication protocols. The network 434 may be a local area network (LAN), wide area network (WAN), a personal area network (PAN), or another network, and the connection to and/or between the IHS 400 and the network 434 may be wired, wireless, or a combination. In certain embodiments, the network 434 may be a single collective component or the network 434 may be coupled to one or more direct connections to remote system(s) and/or services 434. In another embodiment, the network 434 may include a more complex set of interconnection such as the Internet. NIC 432 may transmit to and receive data and signals from the IHS 400 using one or more communication protocols.

Embedded controller (EC) 430 may be coupled to the PCH 412 and configured to boot the IHS 400 and perform other functions. EC 430 may include read only memory (ROM), random access memory (RAM), and a processing device such as a controller, microcontroller, microprocessor, ASIC, or another comparable device for executing program instructions stored within a ROM and/or RAM. For example, EC 430 may be configured to execute pre-boot operations using the EOS 428 in coordination with the BIOS 418 and a high-efficiency processor core (not shown) for the IHS 400.

Figure 5:
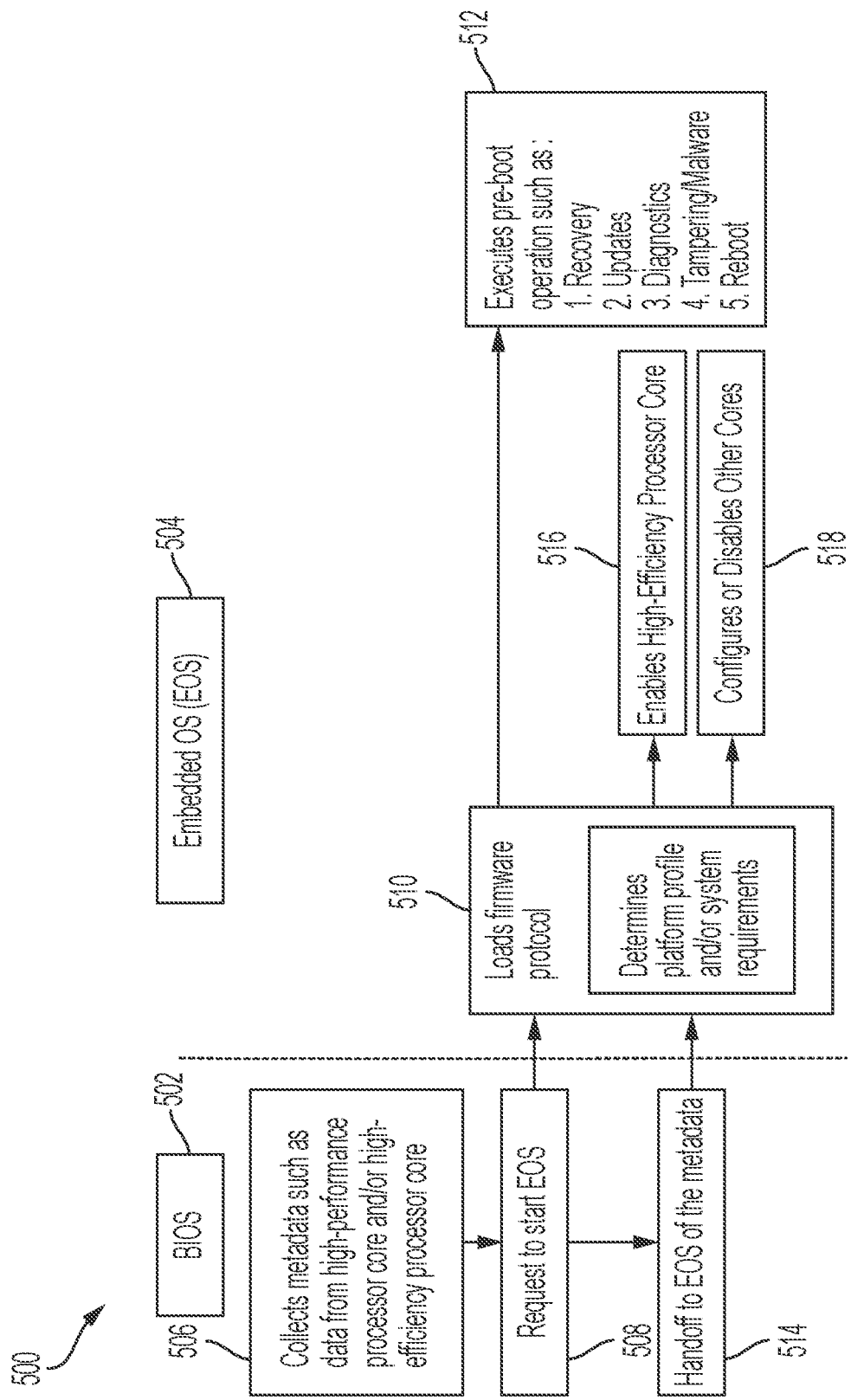
FIG. 5 is a sequence flow diagram of the system according to some embodiments of the disclosure.

FIG. 5 illustrates a sequence flow of operations 500 in an information handling system (IHS) with a one or more high-performance processor cores and high-efficiency processor cores for executing a basic input/output system (BIOS) 502 and/or an embedded operating system 504. In some embodiments, the blocks in the sequence flow 500 may be implemented before pre-boot authentication that may include one or more authentication tasks. Block 506 depicts the observation stage of the method 500. During observation, the BIOS 502 may collect information such as IHS data and/or a platform profile from the main core, the high-efficiency processor core, or another components. For example, BIOS 502 may collect data such as a power attribute, thermal attribute, power-supply unit attribute, fan attribute. In some embodiments, the platform profile may include a power profile such as a high-performance mode, a balanced-power mode, or low-power mode. In other embodiments, the platform profile may include a boot profile with a pre-boot mode, a boot mode, a reboot mode, a reset mode, a restore mode, a recovery mode, or a diagnostic mode. Based on the information, the BIOS 502 may instruct a first core to load the EOS 504 at block 508. In some embodiments, the BIOS 502 may dispatch a data terminal equipment (DXE) module to load the EOS 504.

At block 514, the BIOS 502 may hand-off metadata information, such as hand-off block 110 of FIG. 1, from block 506 to block 510. At block 510, the EOS 504 may load a firmware protocol such as the hybrid boot-strap protocol (HBP) to determine the IHS configurations for the boot operations and/or modules. For example, the EOS 504 may enable the high-efficiency processor core at block 516 and/or may configure other cores at block 518. For example, the EOS 504 may define the high-efficiency processor core as the bootstrap processor and disable the high-performance processor core at blocks 516 and 518. In some embodiments, the EOS 504 may configure the high-performance processor core or another device in the IHS to operate in an ON-state, OFF-state, low-power state, or other operational state. For example, the EOS 504 may define the high-performance processor core as the bootstrap processor based on the data and/or the platform profile.

The EOS 504 may operate the platform by controlling the high-efficiency processor core in the ON-state at block 516 and continue to collect information on the IHS such as platform post errors and hardware errors. Based on the information from block 506 and/or collected throughout the sequence flow of operations 500, the EOS defines the pre-boot operations and delegate tasks to the high-efficiency processor core. At block 512, the high-efficiency processor core or another core may execute EOS operations such as diagnostics, recovery, updates, tampering, malware, reboot, and other operations for the IHS. After all scheduled and/or desired EOS operations are completed and/or the user inputs to exit the EOS 504, the EOS 504 executes a boot loader for loading a user operating system from a storage device.

Figure 6:
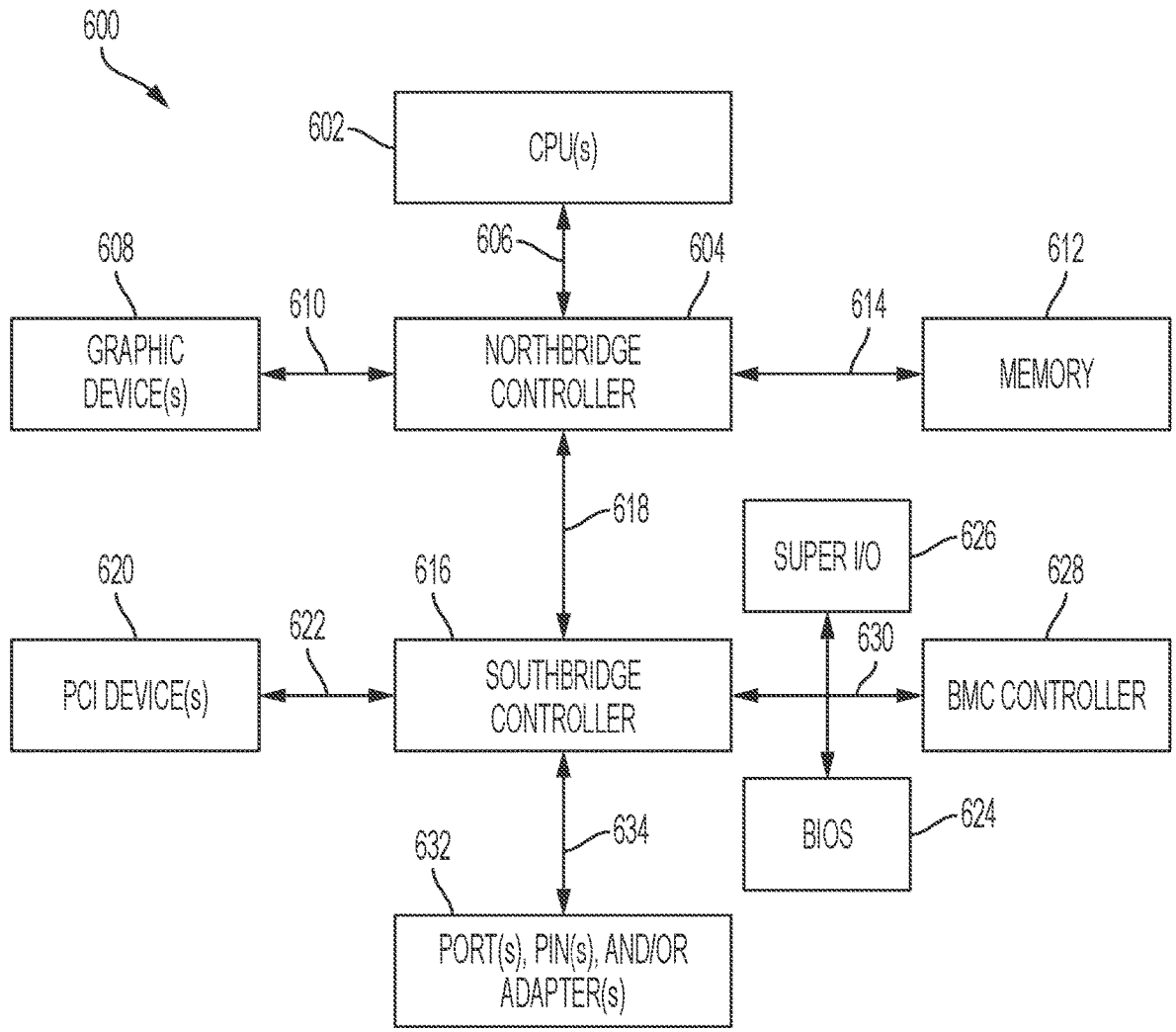
FIG. 6 is a schematic block diagram of an example information handling system according to some embodiments of the disclosure.

An information handling system may include a variety of components to generate, process, display, manipulate, transmit, and receive information. Any of the illustrated components may be coupled to each other by a cable or another component. One example of an information handling system 600 is shown in FIG. 6. IHS 600 may include one or more central processing units (CPUs) 602. In some embodiments, IHS 600 may be a single-processor system with a single CPU 602, while in other embodiments IHS 600 may be a multi-processor system including two or more CPUs 602 (e.g., two, four, eight, or any other suitable number). CPU(s) 602 may include any processor capable of executing program instructions. For example, CPU(s) 602 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 602 may commonly, but not necessarily, implement the same ISA.

CPU(s) 602 may be coupled to northbridge controller or chipset 504 via front-side bus 506. The front-side bus 506 may include multiple data links arranged in a set or bus configuration. Northbridge controller 604 may be configured to coordinate I/O traffic between CPU(s) 602 and other components. For example, northbridge controller 604 may be coupled to graphics device(s) 608 (e.g., one or more video cards or adaptors, etc.) via graphics bus 610 (e.g., an Accelerated Graphics Port or AGP bus, a Peripheral Component Interconnect or PCI bus, etc.). Northbridge controller 604 may also be coupled to system memory 612 via memory bus 614. Memory 612 may be configured to store program instructions and/or data accessible by CPU(s) 602. In various embodiments, memory 612 may be implemented using any suitable memory technology, such as static RAM (SRAM), synchronous dynamic RAM (SDRAM), non-volatile/Flash-type memory, or any other type of memory.

Northbridge controller 604 may be coupled to southbridge controller or chipset 616 via internal bus 618. Generally, southbridge controller 616 may be configured to handle various of IHS 600's I/O operations, and it may provide interfaces such as, for instance, Universal Serial Bus (USB), audio, serial, parallel, Ethernet, etc., via port(s), pin(s), and/or adapter(s) 632 over bus 634. For example, southbridge controller 616 may be configured to allow data to be exchanged between IHS 600 and other devices, such as other IHSs attached to a network. In various embodiments, southbridge controller 616 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 616 may also enable connection to one or more keyboards, keypads, touch screens, scanning devices, voice or optical recognition devices, or any other devices suitable for entering or retrieving data. Multiple I/O devices may be present in IHS 600. In some embodiments, I/O devices may be separate from IHS 600 and may interact with IHS 600 through a wired or wireless connection. As shown, southbridge controller 616 may be further coupled to one or more PCI devices 620 (e.g., modems, network cards, sound cards, video cards, etc.) via PCI bus 622. The PCI devices 620 may couple to other information handling systems (such as through network cabling) and electronic devices (such as through audio cabling), in which the coupling is through wires according to embodiments of this disclosure. Southbridge controller 616 may also be coupled to Basic I/O System (BIOS) 624, Super I/O Controller 626, and Baseboard Management Controller (BMC) 628 via Low Pin Count (LPC) bus 630.

BIOS 624 may include non-volatile memory having program instructions stored thereon. The instructions stored on the BIOS 624 may be usable CPU(s) 602 to initialize and test other hardware components and/or to load an Operating System (OS) onto IHS 600, for example during a pre-boot stage. For example, BIOS 624 may also refer to a set of instructions, stored on BIOS 624, that are executed by CPU(s) 602. As such, BIOS 624 may include a firmware interface that allows CPU(s) 602 to load and execute certain firmware, as described in more detail below. In some cases, such firmware may include program code that is compatible with the Unified Extensible Firmware Interface (UEFI) specification, although other types of firmware may be used. For example, UEFI may include UEFI BIOS modules which may place the IHS 600 in a pre-OS state, detect an attribute of the IHS, such as a platform configuration policy or a particular power on self-test (POST) error, and launch an embedded operating system kernel in an authenticated environment. Based on the particular platform configuration policy, additional pre-boot modules may be downloaded, loaded, and implemented such as an initial ramdisk (initrd) module and one or more applications specific to a particular diagnostic module.

BMC controller 628 may include non-volatile memory having program instructions stored thereon that are usable by CPU(s) 602 to enable remote management of IHS 600. For example, BMC controller 628 may enable a user to discover, configure, and manage BMC controller 628, setup configuration options, resolve and administer hardware or software problems, etc. Additionally or alternatively, BMC controller 628 may include one or more firmware volumes, each volume having one or more firmware files used by the BIOS' firmware interface to initialize and test components of IHS 600.

In some embodiments, IHS 600 may be configured to access different types of computer-accessible media separate from memory 612. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 600 via northbridge controller 604 and/or southbridge controller 616. Super I/O Controller 626 combines interfaces for a variety of lower bandwidth or low data rate devices. Those devices may include, for example, floppy disks, parallel ports, keyboard and mouse, temperature sensor and fan speed monitoring, etc.

In some embodiments, northbridge controller 604 may be combined with southbridge controller 616, and/or be at least partially incorporated into CPU(s) 602. In other implementations, one or more of the devices or components shown in FIG. 6 may be absent, or one or more other components may be added. Accordingly, systems and methods described herein may be implemented or executed with other computer system configurations. In some cases, various elements shown in FIG. 6 may be mounted on a motherboard, coupled to a PCB, paddleboard or other connector, or protected by a chassis or the like.

The flow chart and sequence flow diagrams of FIG. 2 and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in an information handling system. For example, an information handling system may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although a high-efficiency processor core is described throughout the detailed description, aspects of the disclosure may be applied to the design of or implementation on different kinds of cores such as high-performance cores, low-power cores, big cores, small cores, or other types of cores. Other kinds or types of cores or other components may be used in the invention depending on applications and operations performed. As another example, although processing of certain kinds of data or attributes may be described in example embodiments, other kinds of data or attributes may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
executing, by a first processor core of an information handling system, a basic input/output system (BIOS);
executing, by the first processor core, an embedded operating system (EOS) after executing the BIOS;
determining, by the first processor core, based on a first attribute whether to hand-off execution of the EOS to a second processor core having a different configuration than the first processor core; and
when the first processor core determines to hand-off execution to the second processor core, handing off execution of the EOS to the second processor core.

2. The method of claim 1, further comprising executing, after beginning execution of the EOS and without rebooting the information handling system, by the EOS at least two EOS operations, the EOS operations comprising at least one of: executing a diagnostics routine, executing a recovery routine, or updating settings of the BIOS.

3. The method of claim 2, wherein executing, by the EOS, at least two EOS operations comprises executing a first EOS operation on the second processor core; and executing a second EOS operation on a third processor core.

4. The method of claim 1, wherein executing the EOS comprises executing, on the second processor core, an operating system restore operation, wherein the first attribute comprises a low battery charge level.

5. The method of claim 1, further comprising executing, by the EOS, a boot routine for the information handling system.

6. The method of claim 1, further comprising configuring, by the EOS executing on the second processor core, components of the information handling system based on the first attribute.

7. The method of claim 1, further comprising disabling the first processor core after handing off execution of the EOS to the second processor core.

8. The method of claim 1, wherein the first attribute comprises at least one of a power attribute, a thermal attribute, a power supply unit attribute, or a fan attribute.

9. The method of claim 1, wherein handing off execution of the EOS to the second processor core comprises handing off execution of the EOS to a smaller processor core than the first processor core.

10. An information handling system, comprising:
a memory;
a processor comprising a first processor core and a second processor core, the processor coupled to the memory, wherein the processor is configured to perform steps comprising:
executing, by a first processor core of an information handling system, a basic input/output system (BIOS);
executing, by the first processor core, an embedded operating system (EOS) after executing the BIOS;
determining, by the first processor core, based on a first attribute whether to hand-off execution of the EOS to a second processor core having a different configuration than the first processor core; and
when the first processor core determines to hand-off execution to the second processor core, handing off execution of the EOS to the second processor core.

11. The information handling system of claim 10, wherein the processor is configured to perform steps further comprising executing, by the EOS, after beginning execution of the EOS and without rebooting the information handling system, at least two EOS operations, the EOS operations comprising: executing a diagnostics routine, executing a recovery routine, or updating settings of the BIOS.

12. The information handling system of claim 10, wherein executing, by the EOS at least two EOS operations comprises executing a first EOS operation on the second processor core; and executing a second EOS operation on a third processor core of the processor.

13. The information handling system of claim 10, wherein executing the EOS comprises executing, on the second processor core, an operating system restore operation, wherein the first attribute comprises a low battery charge level.

14. The information handling system of claim 10, wherein the processor is configured to perform steps further comprising executing, by the EOS, a boot routine for the information handling system.

15. The information handling system of claim 10, wherein the processor is configured to perform steps further comprising configuring, by the EOS executing on the second processor core, components of the information handling system based on the first attribute.

16. The information handling system of claim 10, wherein the processor is configured to perform steps further comprising disabling the first processor core after handing off execution of the EOS to the second processor core.

17. A computer program product comprising:
a non-transitory computer readable medium comprising instructions for causing an information handling system to perform the steps comprising:

executing, by a first processor core, an embedded operating system (EOS);

determining, by the first processor core, based on a first attribute whether to hand-off execution of the EOS to a second processor core having a different configuration than the first processor core; and when the first processor core determines to hand-off execution to the second processor core, handing off execution of the EOS to the second processor core.

18. The computer program product of claim 17, wherein the medium further comprises instructions for causing the information handling system to perform steps of, after beginning execution of the EOS and without rebooting the information handling system, by the EOS at least two EOS operations, the EOS operations comprising: executing a diagnostics routine, executing a recovery routine, or updating settings of a BIOS.

19. The computer program product of claim 17, wherein the medium further comprises instructions for causing the information handling system to perform steps of executing a first EOS operation on the second processor core; and executing a second EOS operation on a third processor core.

20. The computer program product of claim 17, wherein the medium further comprises instructions for causing the information handling system to perform steps of disabling the first processor core after handing off execution of the EOS to the second processor core.

* * * * *